July 9, 1946.    F. H. OWENS    2,403,454
PROGRAM PRESELECTING AND CONTROL APPARATUS
Filed Nov. 10, 1942    9 Sheets-Sheet 1

INVENTOR
FREEMAN H. OWENS
BY
ATTORNEY

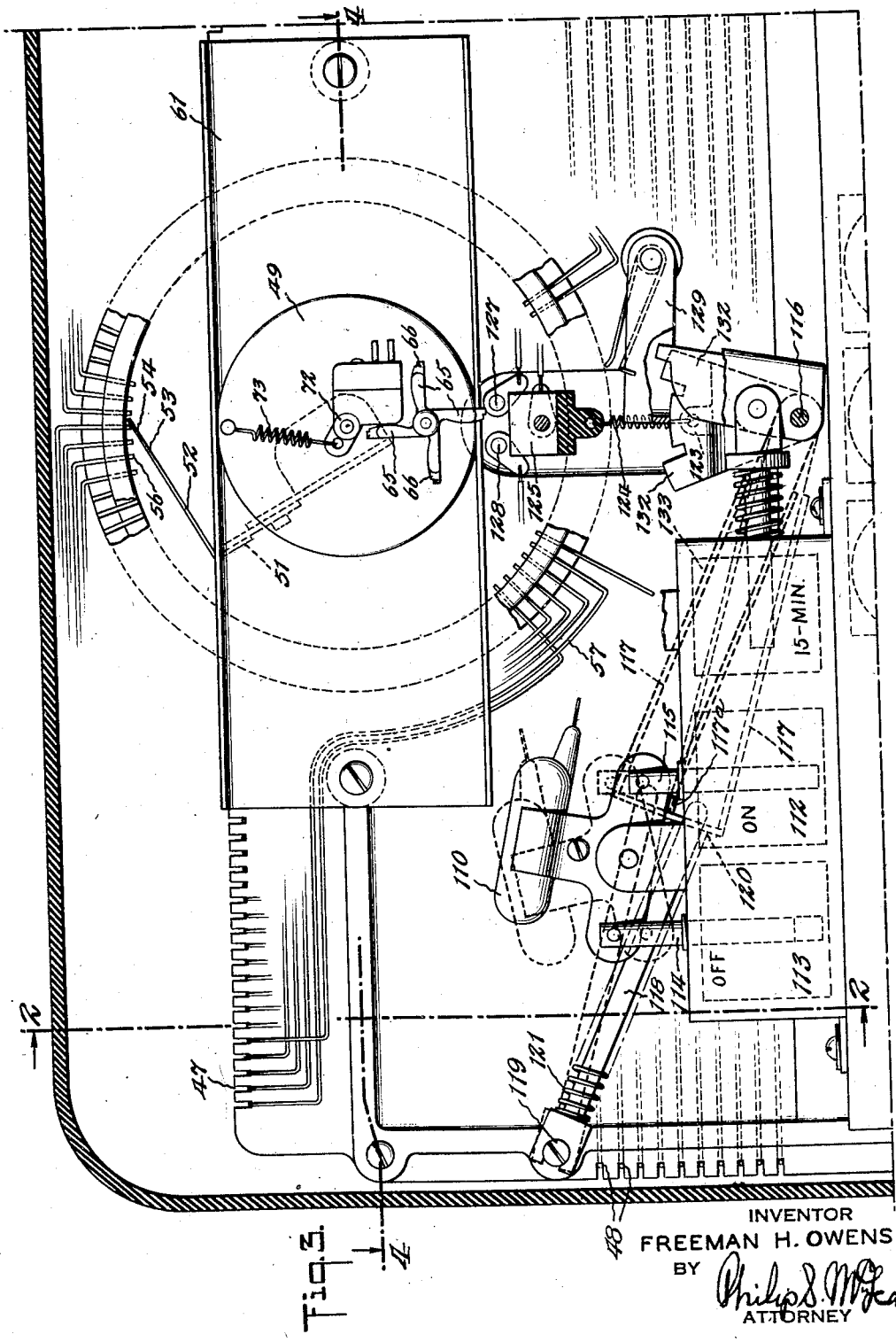

July 9, 1946.　　　F. H. OWENS　　　2,403,454
PROGRAM PRESELECTING AND CONTROL APPARATUS
Filed Nov. 10, 1942　　　9 Sheets-Sheet 4
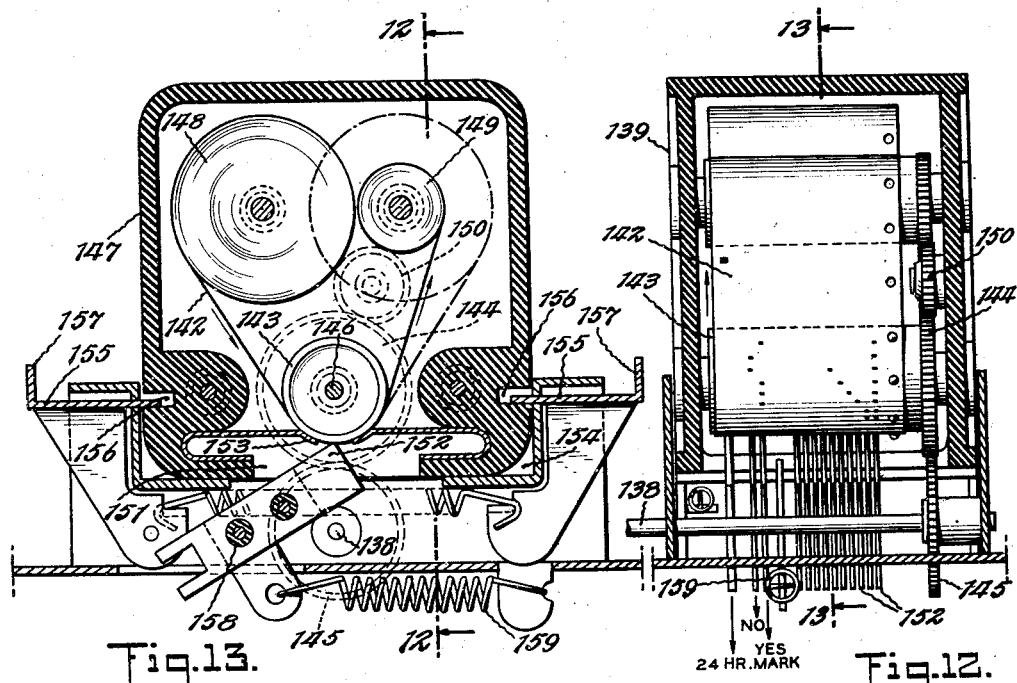
INVENTOR
FREEMAN H. OWENS
BY
ATTORNEY July 9, 1946.　　　F. H. OWENS　　　2,403,454

PROGRAM PRESELECTING AND CONTROL APPARATUS

Filed Nov. 10, 1942　　　9 Sheets-Sheet 5

INVENTOR
FREEMAN H. OWENS
BY
ATTORNEY

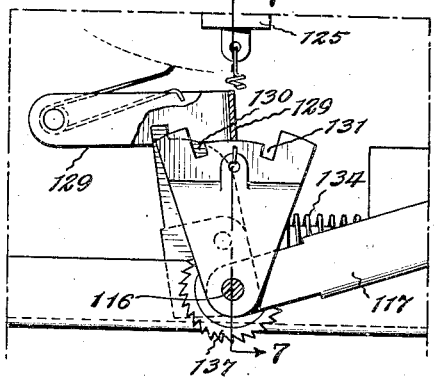
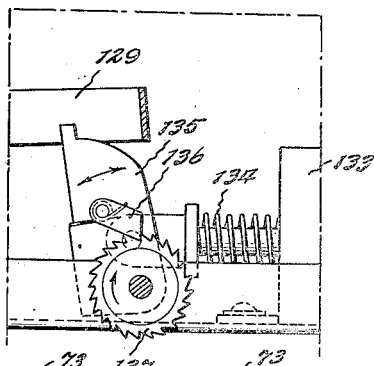
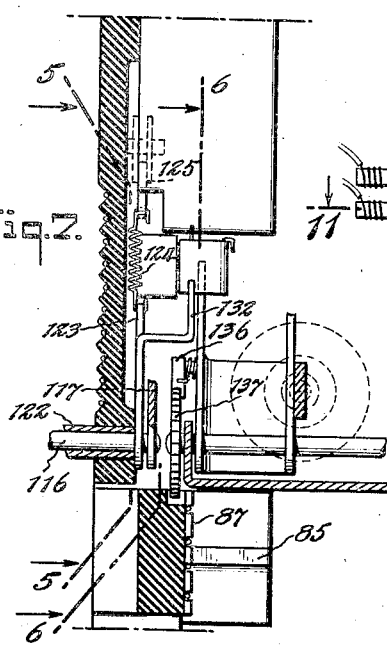
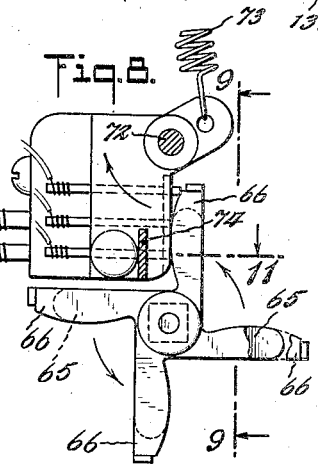
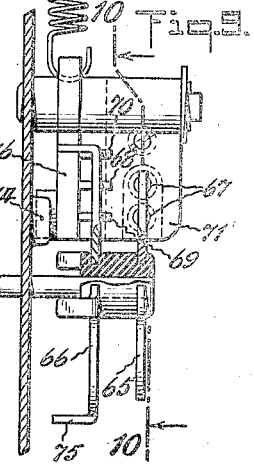
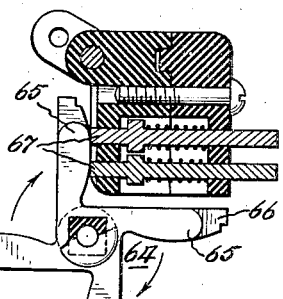
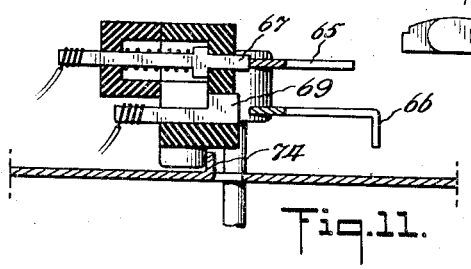
INVENTOR
FREEMAN H. OWENS

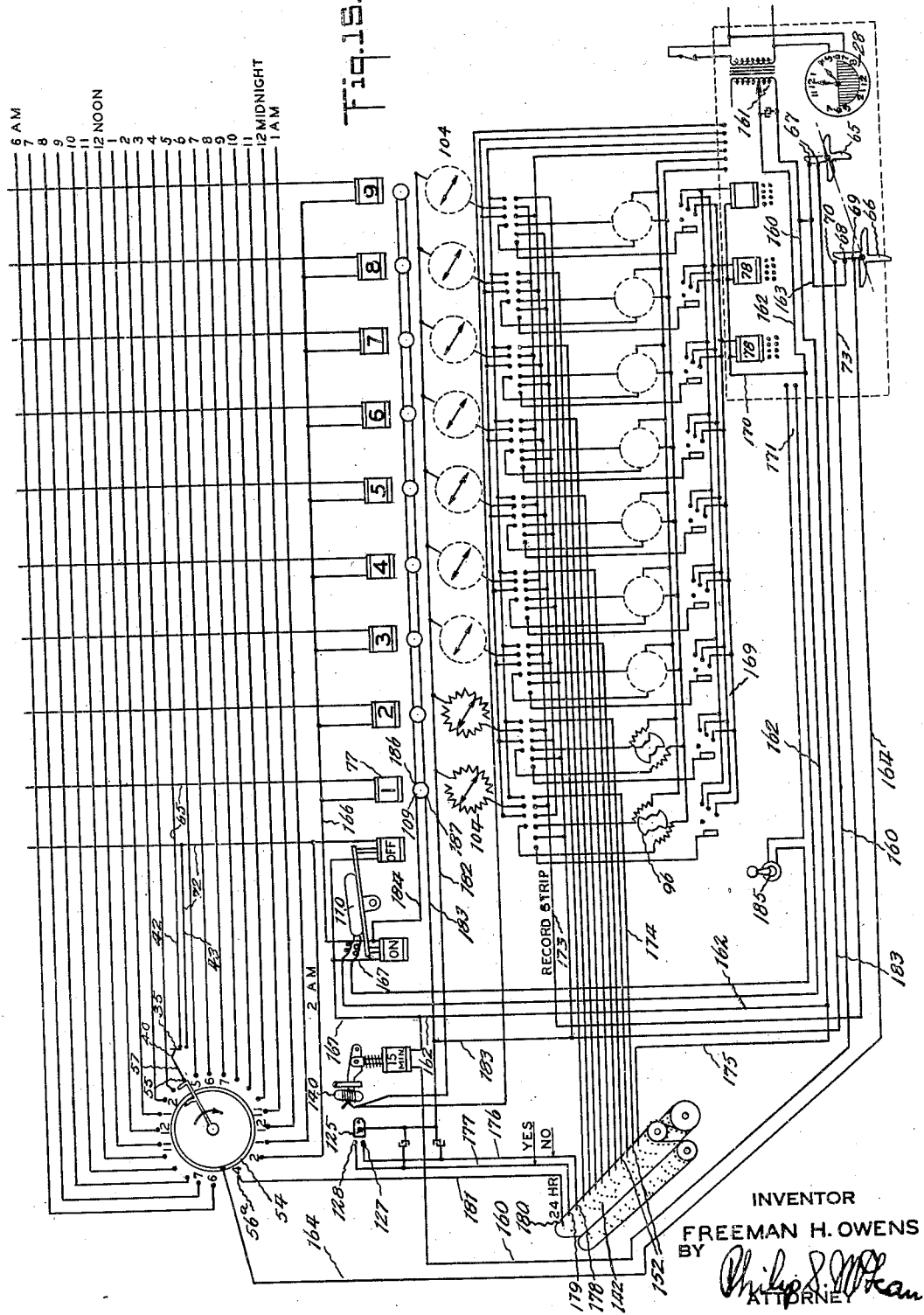

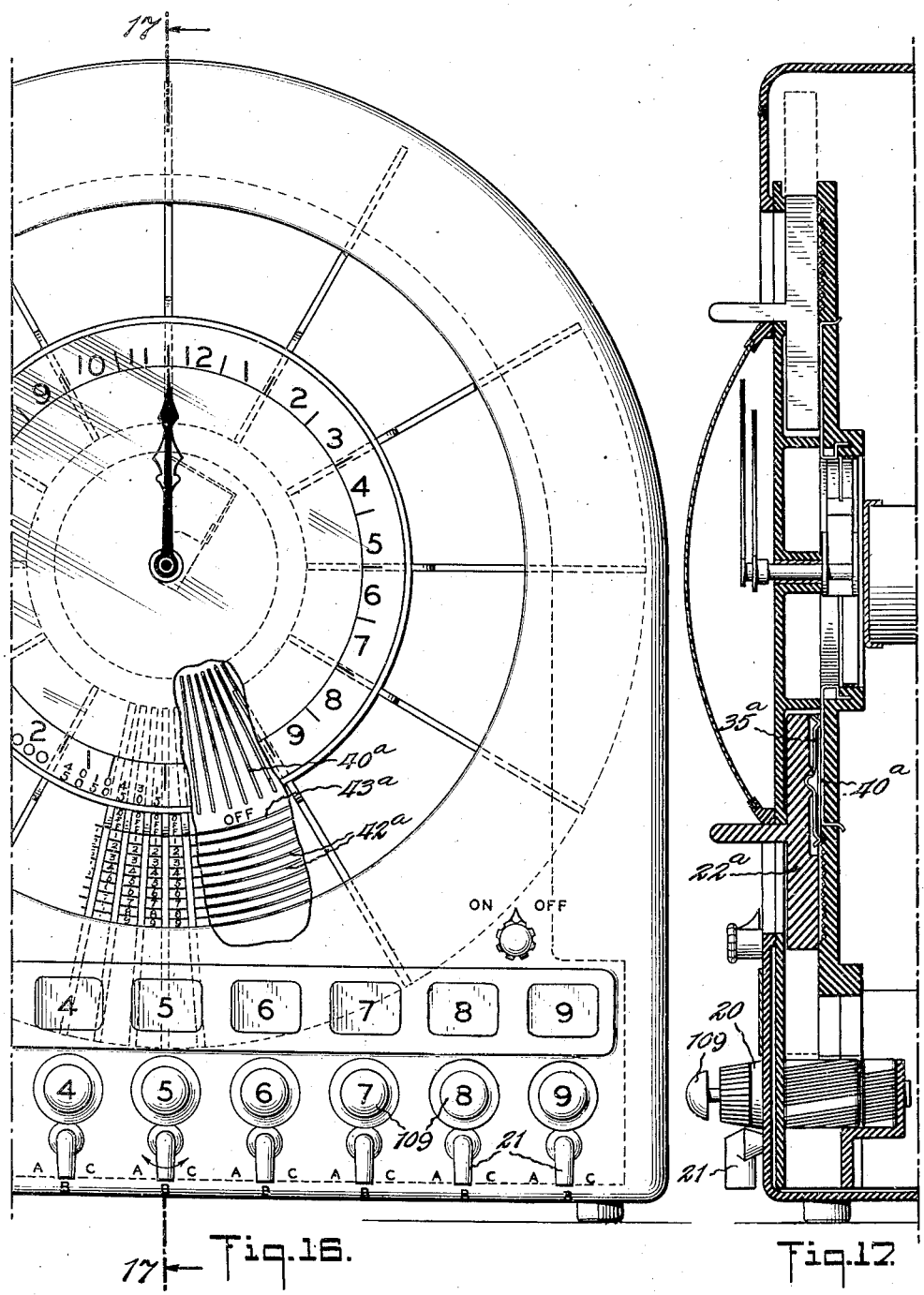

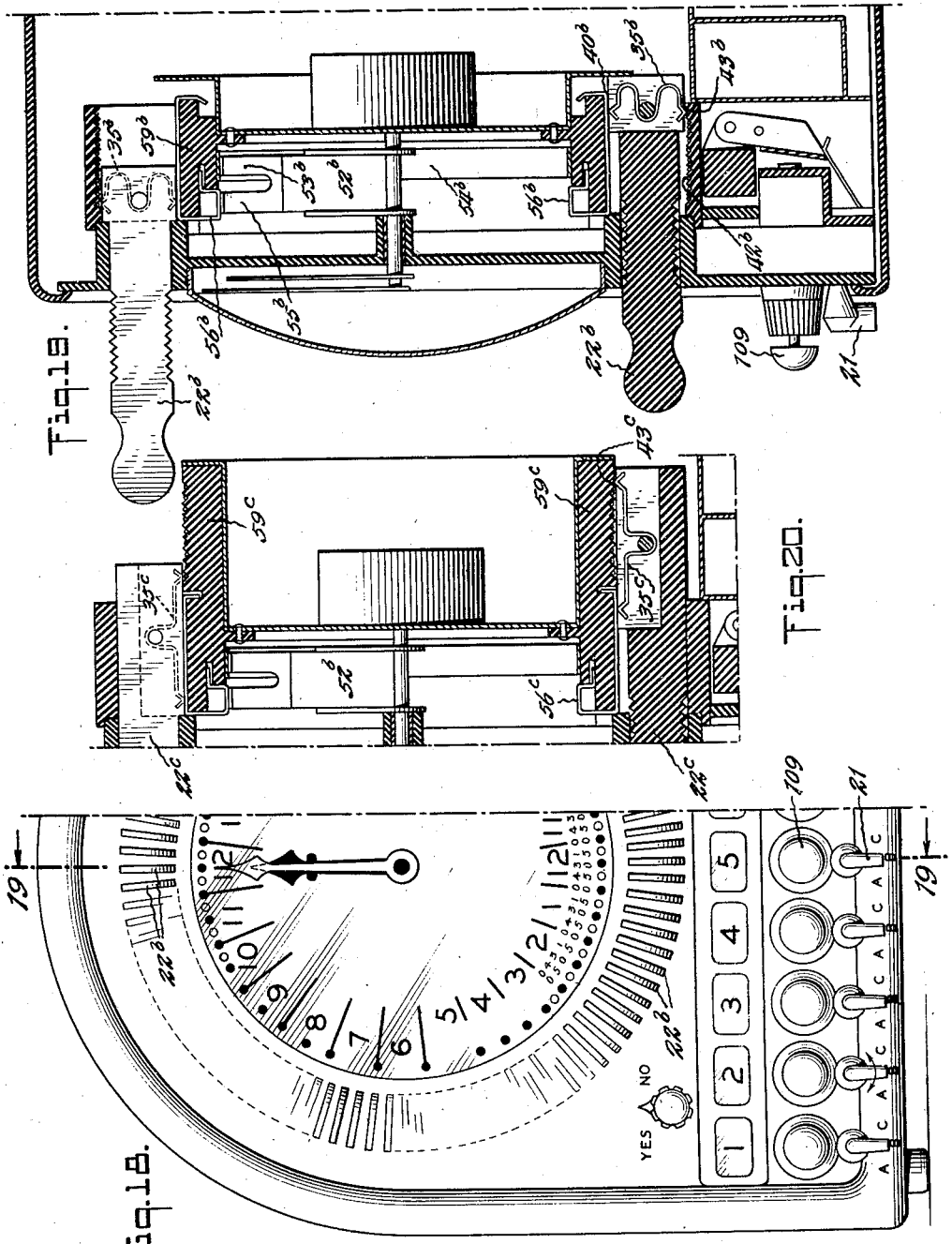

Patented July 9, 1946

2,403,454

UNITED STATES PATENT OFFICE 2,403,454

PROGRAM PRESELECTING AND CONTROL APPARATUS

Freeman H. Owens, New York, N. Y.

Application November 10, 1942, Serial No. 465,155

8 Claims. (Cl. 200—37)

The invention here disclosed relates to apparatus for preselecting certain programs or sequences and is a continuation-in-part of inventions disclosed and covered in copending patent applications, Ser. No. 397,504 filed June 10, 1941, and Ser. No. 450,449 filed July 10, 1942.

Special objects of the present invention are to improve and simplify structural and electrical features and to make it easier to set up the apparatus for any desired program of events.

Particularly it is an object of this invention to enable the apparatus when applied to radio reception, to be quickly adjusted for reception of stations in the various wave bands outside of the usual broadcast bands, for example, in the short wave field, frequency modulation, television and the like.

Other special objects are to reduce the amount of necessary wiring, enable quick and easy assemblage of the parts, to simplify and reduce the number of necessary parts for the selector switches and to provide the timing switch in a more practical form, in which the relatively moving parts are protected against wear, so as to maintain accuracy of timing.

A further object of the invention is to provide a simplified form of master control by which the program selecting mechanism can be turned off at any time without shutting off the time clock and without upsetting any program for which the selector keys have been set.

Another object is to provide a simple form of means for "fading out" one program and "fading in" another in the selecting function of the machine.

Further objects are to provide a simple and reliable form of micrometer control for accurately setting the tuning units and to provide a simple, well protected and easily removable form of record mechanism.

Other objects are to provide the complete apparatus in a compact, small, light, inexpensive, portable unit, attractive in appearance and with the necessary control parts arranged in readily understandable relation.

Other desirable objects will appear as the specification proceeds.

The novel features and combinations through which the purposes of the invention are attained are set forth in the following, broadly covered in the claims and illustrated by way of practical example in the accompanying drawings. It is realized however, that actual physical structure may be modified and changed in various ways all within the true spirit and broad scope of the invention. The illustration therefore is to be considered primarily for purposes of disclosure and not by way of limitation, the actual scope of the invention being as hereinafter broadly defined and claimed.

Fig. 3 is a broken longitudinal sectional view as on substantially the plane of line 3—3 of Fig. 2. Fig. 3a is a broken detail of the fader mechanism.

Fig. 5 is a broken sectional detail of the rocking spring toggle voting switch and lock mechanism as on substantially the line 5—5 of Fig. 7.

Fig. 6 is a similar view of the unlocking cam for the voting switch, substantially on the line 6—6 of Fig. 7.

Fig. 7 is a vertical sectional detail as on substantially the plane of line 7—7 of Fig. 5.

Fig. 8 is a part sectional broken detail of the timing switch as on substantially the line 8—8 of Fig. 2.

Fig. 9 is a broken part sectional view as on line 9—9 of Fig. 8.

Fig. 10 is a sectional detail as on the line 10—10 of Fig. 9.

Fig. 11 is a similar view as on line 11—11 of Fig. 8.

Fig. 12 is a broken vertical sectional view of the recorder.

Fig. 13 is a similar view as on line 13—13 of Fig. 12.

Fig. 14 is a broken sectional view of the micrometer tuning mechanism.

Fig. 15 is a wiring diagram.

Figs. 16 and 17 are broken front and vertical sectional views of one modification and Figs. 18, 19, are similar views of another modified form of the invention.

Fig. 20 is a broken sectional detail illustrating another modification.

Figure 1:
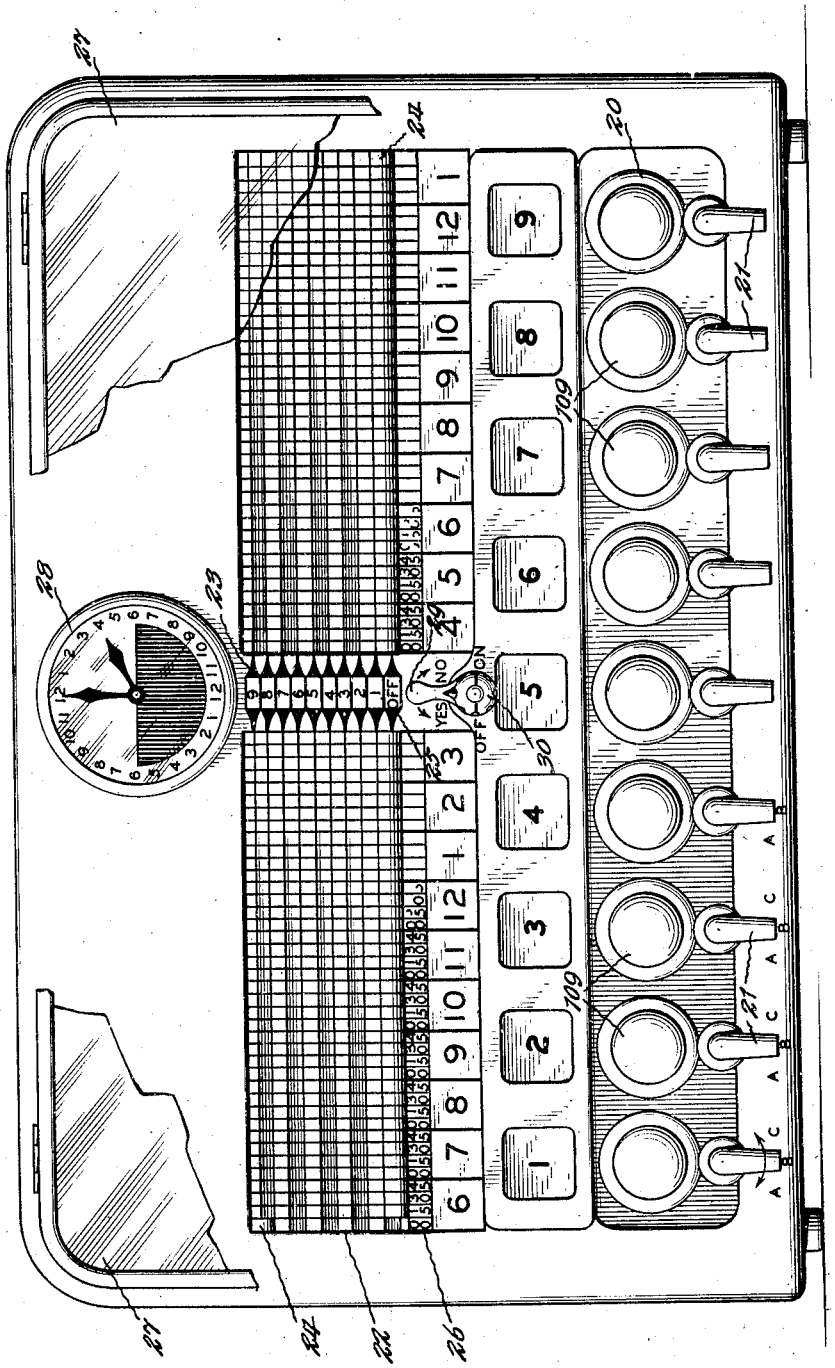
Fig. 1 is a broken front elevation of a present embodiment of the invention.

In the present disclosure, there is illustrated a radio receiver of the small portable or table type, having nine different tuners, each of which can be set to receive stations in three different wave bands and which can be set in each instance to the desired sound level. The stations so tuned and volume controlled can be automatically brought in at selected times by setting time keys slidingly arranged in two banks at opposite sides of a centrally disposed station indicating panel. Voting or the recording of opinions also is provided for.

The tuners, designated 1 to 9, in Fig. 1, have manual controls 20, and below each is a switch handle 21, which can be turned to any one of three positions, designated A, B, C, for tuning in on different wave bands, such as for broadcast, short wave stations, frequency modulation or the like.

The key slides are designated 22, and are provided one for each fifteen minute, broadcast or other predetermined interval, throughout the range of time intended to be covered by the set, such as in the illustration the twenty hour interval running from 6 o'clock in the morning to 2 o'clock at night. There are thus eighty of these slides and they are shown arranged vertically in close side-by-side relation, one half of them to the left and the other half to the right of a central indicating panel 23, carrying station designations or the like for the nine different tuners. Each slide is shown as having a forwardly projecting fingerhold 24, by which it may be shifted vertically to any one of the nine different positions indicated, or to the lower, "off" position indicated at 25.

A horizontally extending scale 26, below the slides identifies them as to the broadcast or other time intervals to which they refer. These keys thus show by their positions, stations which have been selected and the times at which such stations will be brought in.

A hinged cover is indicated at 27, over the front of the set which may be transparent or have a window to expose the setting of the slides and this cover, if desired, may be equipped with a suitable lock to protect the set against unauthorized or undesired meddling.

A twenty-four hour clock is shown at 28, centrally disposed above the keys and forming part of the time train which effects the time selection.

Voting is provided for by a lever indicated at 29, which can be turned to either a "yes" or a "no" position and directly in front of this voting lever or button is shown the "on" and "off" control knob 30.

Figure 2:
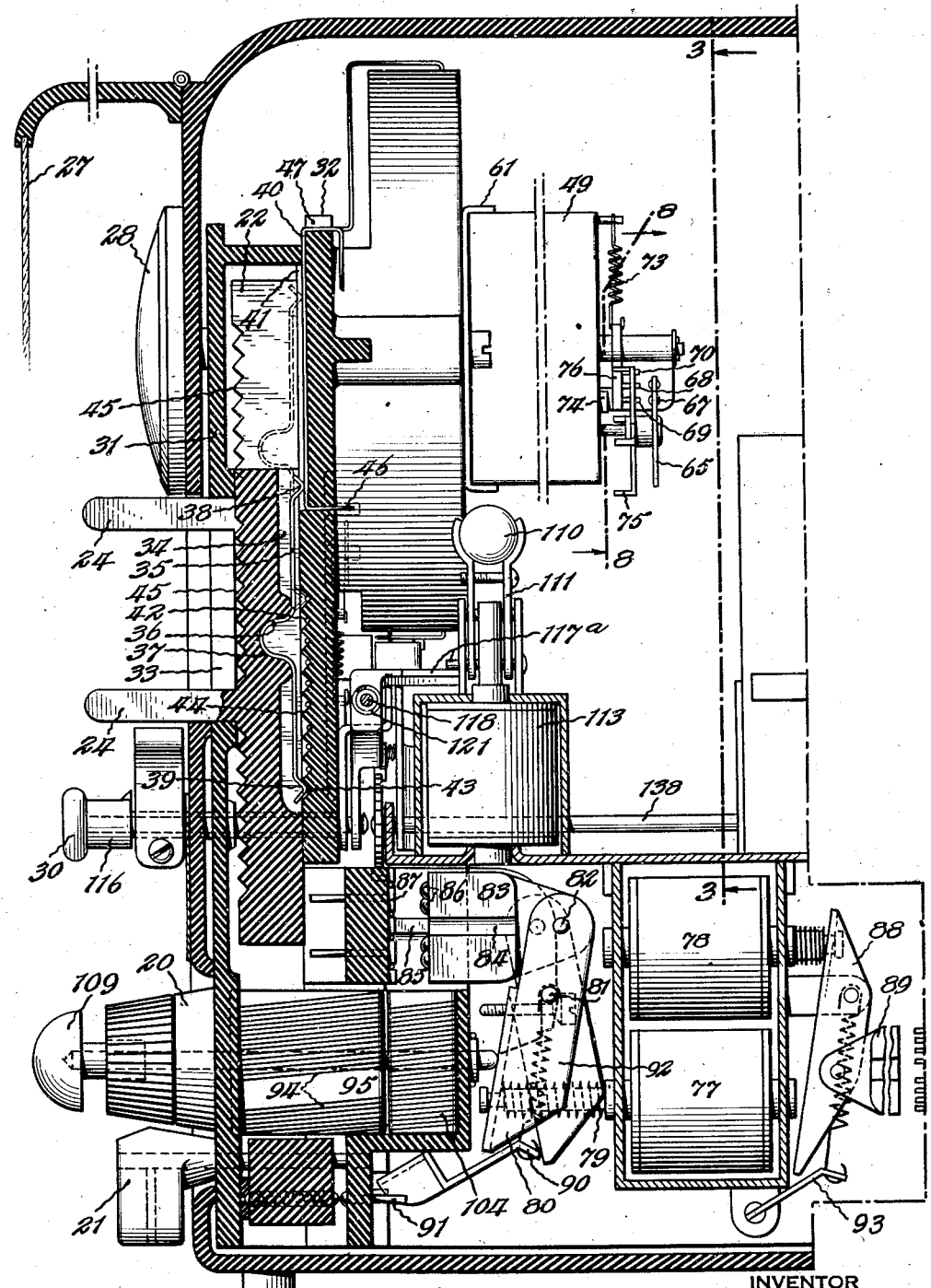
Fig. 2 is a vertical sectional view on a larger scale and as on substantially the plane of line 2—2 of Fig. 3.
Figure 4:
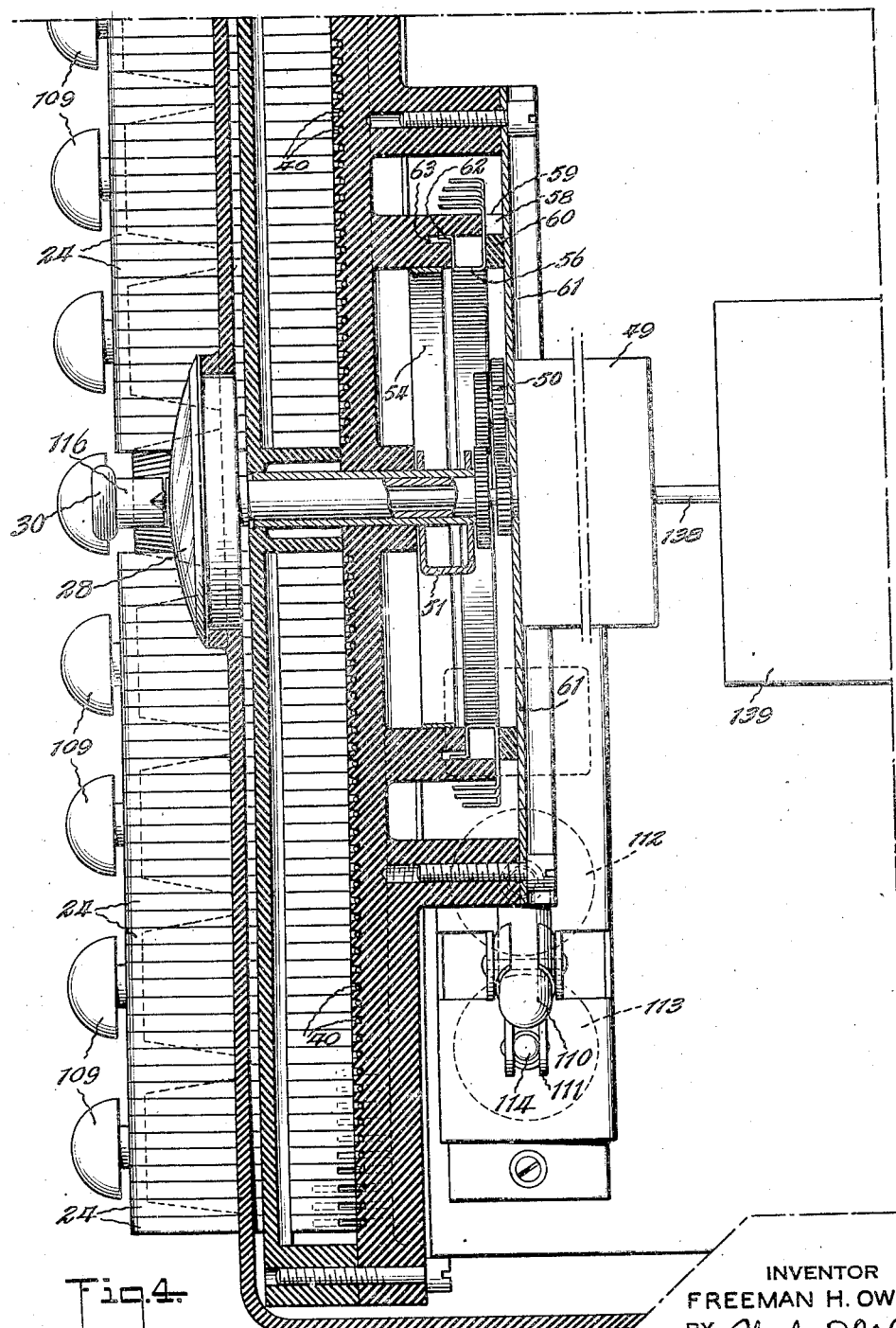
Fig. 4 is a broken horizontal sectional view on substantially the plane of line 4—4 of Fig. 3.

The switch keys, as shown particularly in Figs. 2 and 4, are small thin slides of suitable insulating material, confined in flat side-by-side relation between spaced front and back panels 31, 32, the front panel being open at 33, for passage of the key projections 24.

The backs of the key slides are shown longitudinally grooved or recessed at 34, to receive contact strips or wires 35, having bowed central portions 36, entering correspondingly shaped positioning notches 37, in the grooves and having V-bent ends 38, 39, respectively, to ride the straight vertically extending time contacts 40, in vertical grooves 41, in the top portion of back panel 32, and to engage the different station selecting contacts 42, or the lower "off" contact 43, disposed in the horizontally extending V-shaped grooves 44, in the lower portion of said panel.

As shown particularly in Fig. 2, the contacts in the back of the slides thus serve as spring brushes to bridge across from the vertically extending time contacts to any one of the nine station contacts or the lower "off" contact.

Any or all of these contact elements may be made of wire. The arched formation of the brush contact, provided by the forwardly projecting V-shaped tips and the reversely projecting intermediate bend enables these wires to be held against turning in the narrow and relatively deep slots in the backs of the slides. The intermediate bowed portion in addition to holding the wire to move with the slide, imparts a spring quality to the opposite end portions causing these to act as spring fingers. The upper V-shaped brush tip is kept in engagement with the vertical contact wire by sliding in the vertical groove, in which that wire is laid and the lower V-shaped tip acts as a spring detent in the V-shaped grooves to retain the slide in variously shifted positions. Also by reason of the arched shape, the intermediate portion of the brush wire is fully clear of any intermediate bus wires which it spans.

As a visual aid to the accurate positioning of the slides, the latter may be ridges as indicated at 45, on their front exposed faces in such relation that all the ridges should register in all selecting positions of the slides.

The vertical, time selecting wires are shown as secured in the vertical grooves by having their lower ends bent and passed back through openings in the panel at 46, and their upper ends bent back through notches 47, in the upper edge of the panel. The horizontally extending station representing wires or buses are indicated in Fig. 3, as secured in the V-shaped grooves by having their ends bent back through notches 48, in the ends of the back panel.

The time clock mechanism is indicated as including a constant speed electric motor at 49, which through proper gearing 50, rotates a distributor arm 51, one revolution for each twenty-four hours. This arm carries a brush 52, having a current collecting branch 53, bearing on a current supply ring 54, and another portion 55, engaging contact segments 56, connected by wiring 57, with the vertical time wires 40.

As shown particularly in Fig. 3, each complete time connection may be a single continuous length of wire, having a vertical portion set in a vertical slot in the back panel and an integral connecting portion 57, extending to a brush contact portion 56. The latter are positioned in a circular series by being located in radial slots 58, in an annular support 59, on the back of the panel, held so by a retainer ring 60, slipped into the annular support over the radially projecting portions of the wires, this ring in turn being held by the back plate 61, which supports the time clock mechanism. The inner ends of the brush contact portions of these wires are shown angled at 62, and entered in a holding and positioning groove 63. These combined switch contact and distributor contact wires may be preformed in shapes to fit the panel structure and may be ordinary enameled wires having the insulation removed at the opposite end portions which form the time contacts for the selector switches and the brush contacts for the distributor.

The distributor brush is arranged to pass from one contact to the next prior to the end of each broadcast or other time interval, to set up the next time circuit in readiness to be closed at the instant of change from one period to another.

The actual closing of the time circuit is effected by an accurately operating timer in the nature of a star wheel 64, driven from the time train, in this instance, one revolution per hour and having one set of four curved face radially extending contact arms 65, and behind those a similar set of longer contact arms 66, Figs. 3, 8, 9. The first set of timer arms 65, are positioned to engage and contact a pair of yielding spring pressed terminals 67, Fig. 10, in a so-called "fifteen minute" solenoid circuit and the arms of the other contactor are designed to connect first terminals 68, 69, to connect the distributor ring 54, in the circuit and then to connect terminals 69 and 70, to close the recording circuit. All five of these terminals are shown mounted in an insulating rocker 71, pivoted at 72, and yieldingly held by spring 73, positioned against a stop 74, ready for engagement by said rotating contactor arms. The longer arms 66, are shown as having angularly bent ends 75, engageable with a cam portion 76, of the rocker to perform the function of sweeping the rocker out of the way after the arms have completed their circuit closing, accurate timing operations.

The time circuits determined by the distributor brush and the star wheel accurate timer include magnetic circuit closers selected by the slide keys and designated 77, Fig. 2, one for each of the nine tuners, also in each case one of the three solenoids 78, selected by the wave band switch 21, associated with that particular tuner.

The solenoids 77, are shown as having cores 79, connected with the lower ends of rocker levers 80, pivoted at 81, and connected at their upper ends at 82, with insulating blocks 83, slotted at 84, to slide over the ribs 85, and carrying contacts 86, on their forward faces to cooperate with stationary contacts 87. Similarly the wave band selecting solenoids 78, operate rockers 88, Fig. 2, connected with sliding blocks 89, carrying contact elements to close the wave band selecting circuits.

A universal latch bar 90, pivoted at 91, and supported by spring 92, is provided to catch and hold the lower end of the lever 80, which has been actuated by the solenoid 77, which has been energized and a similar universal bar is provided at 93, for holding the rocker which has been actuated by the particular wave band selecting solenoid in circuit at the time.

Details of the wiring controlled by the switch blocks 83 and 89, are not illustrated, as the same may vary widely, depending upon the particular radio circuits, the type of tuning employed, etc.

In the illustration, tuners of the inductance or permeability type are shown, by way of example, involving coils 94, wound about a flat strip of insulation 95, rolled into cylindrical form and a segmental core 96, Fig. 14, which can be rotated within the coils by the knob 20.

For purposes of fine tuning, a vernier knob 97, is illustrated, directly in front of and appearing as a portion of the direct acting knob 26, said vernier knob carrying an outer ball race cup 98, containing balls 99, bearing on an inner race member 100, supported on an inner row of balls 101, and having a tongue 102, extending through an arcuate slot 103, into engagement over a reduced diameter portion of the core.

Figs. 2 and 14 show the volume controls as made up of resistance windings 104, wound about a strip of insulation 105, rolled into cylindrical form and supported at the end of the tuning coil cylinder in position to be engaged by brush elements 106, on the central rotary spindle 107.

The spindles 107, are mounted for longitudinal sliding as well as rotary movements and are yieldingly held in the projecting position illustrated by springs 108. Actuating knobs 109, are provided on the outer ends of these slidable spindles and the inner ends are disposed opposite the lower ends of the switch actuating rockers 92, thus to provide for manual closing of any one of the nine tuning switches at any time and independently of the automatic program control exercised by the solenoids 77.

In addition to acting as a pusher for mechanically actuating the switch closing rocker 92, independently of the solenoid, the spindle 107, carries a contact 185, for bridging contacts 186, 187, to close the circuit through the "on" magnet each time such a manual is operated.

An "on" and "off" switch of the mercury type is indicated at 110, mounted on a rocker 111. This is connected to control the supply of actuating current to the solenoids and other instrumentalities and is operated automatically on the closing of the timing circuit by the "on" and "off" solenoids 112, 113, having cores 114, 115, Fig. 3, connects with opposite ends of the switch rocker.

The master switch knob 30, Figs. 1 and 2, provides a means by which the unit may be turned off at any time without shifting the key slides to their "off" positions and thus without disturbing the program setting.

In the illustration, the knob 30 is mounted on the outer end of a rock shaft 116, carrying at its inner end one link 117, of a spring toggle, the other link 118, being pivoted at 119, the two links having a sliding and rocking center connection at 120, and the spring 121, acting to hold the toggle "broken" in either of the two positions indicated in Fig. 3. A lateral extension 117a, on link 117, reaches in under the switch rocker to throw the latter to the "off" position. In the lower, full line position of the spring toggle, the set is turned "on" and the automatic program selection is in full control. In the upper dotted line position, accomplished by turning the master switch knob 30, to the left in Fig. 1, the set is rendered inoperative and will remain so until the master switch is turned back to the "on" position. The time train however, continues in operation, so that the program selection is ready to come into action again as soon as the master switch is again turned "on." The latter result is made possible by reason of the fact that the toggle spring is strong enough to resist the pull of the "on" magnet 112, which magnet even when the set is turned "off" continues to be energized by the timing circuit for each broadcast or other period for which the set has been designed. The spring toggle being effective to rock the mercury switch only in the "off" direction, leaves the "off" magnet free to act at any time interval when the master switch is in the "on" position.

In place of a special master switch described, a simple "on" and "off" switch 185, Fig. 15, may be cut into the mercury switch circuit or the master switch might be arranged just to cut off the supply of plate current, leaving the filaments heated and ready for instant operation at the turning "on" of the set.

The "yes" and "no" or voting lever 29, is shown in Figs. 2 and 7, as carried by a sleeve 122, about the master switch spindle 116. This sleeve carries a lever 123, at its inner end, connected by spring 124, with a rocking contactor 125, pivoted at 126, so as to swing one way or the other into engagement with the "yes" and "no" contact studs 127, 128, Fig. 3.

To hold the voting switch 125, in one position or the other to the end of that period in which the vote has been recorded, a spring latch 129, is provided, which will drop into one or the other of the notches 130, 131, in the locking segment extension 132, of the lever 123, Figs. 5 and 7.

The release of this latch is effected at the end of the period by the so-called fifteen minute solenoid 133, Figs. 3 and 6, having a movable core 134, connected with a pivoted cam lever 135, designed to ride up under the tip of the latch and lift it out of the notch 130 or 131.

The cam lever 135, is shown in Figs. 5 and 7, as carrying a pawl 136, in engagement with a ratchet 137, on a shaft 138, extending rearwardly to operate the tape advancing mechanism of the recorder as indicated at 139, Figs. 2 and 4.

The fifteen minute or time period solenoid 133, also may be utilized to actuate a "fader" indicated in Fig. 3a, as comprising a resistance coil or coils 140, on the swinging lever 135, and engaged by a spring brush or brushes 141, to gradually fade out one and gradually fade in another rendition when a shift is made from one program to another.

The recorder is indicated in Figs. 12 and 13, as including a tape or record strip 142, advanced step-by-step by a sprocket wheel 143, driven by companion gears 144, 145, from the intermittently rotating shaft 138. The sprocket wheel shaft 146, is shown journalled in the lower portion of a casing 147, which contains also the supply reel at 148, and take-up reel 149, the latter driven by slip gearing 150, from the sprocket wheel shaft.

The recorder casing as shown in Fig. 13, is open at the bottom at 151, to expose the electrodes 152, to that portion of the tape passing under the sprocket roll beneath the slotted retainer plate 153.

The entire record containing unit is removably seated in a pocket or cavity 154, where it is releasably held by spring latches 155, entering notches 156, in opposite sides of the record case. Exposed fingerholds 157, enable these spring latches to be readily withdrawn to release the record case.

The electrodes 152, are shown as pivotally supported at 158, and as rocked upwardly into position for cooperation with the record tape by spring 159.

The described construction enables the record strip unit to be readily placed in or removed from the machine by any one familiar with the structure. If desired, the latches 157, may have suitable locks, so that only one with a key for the purpose may have access to the record strip.

In the light of the foregoing, the wiring diagram is practically self-explanatory.

The distributor brush 55, sets up a circuit for each time interval, every quarter hour and exactly at the end of one interval and the beginning of the next, one of the timer arms 65, closes a circuit across contacts 67, and wiring 160, from one end of the power transformer secondary 161, through the fifteen minute solenoid 133, and by wiring 162, back to the other side of the secondary. At the same time one of the contact arms 66, connects terminals 68, 69, to send current by wiring 160—163—164, to the distributor supply ring 54. If the slide key for that particular time, 4 p. m. in the illustration is in one of the station selecting positions, for example, station No. 1, current will flow by connections 56, 57, 40, slide wire 35, horizontal conductor 42, and wiring 165, to the No. 1 solenoid 77, returning by connections 166, and through the "on" solenoid 112, and connections 167—162 to the other side of the line.

The band selecting solenoid 78, which has been cut in for operation by the band selecting switch 21, at station 1, is energized at the same time through circuit wiring 168, closed by the sliding solenoid switch block 83, and wiring 169, from the wave band switch, returning to source by wiring 170—162.

The action of the "on" solenoid assures closing of mercury switch 110, in the supply circuit 171, to the radio receiver in the event the key slide for the preceding interval had been set in the "off" position.

If the key slide for the time supposed is set in the "off" position, the slide wire 35, will carry current to the lower, "off" bus wire 43, and by wiring 172, to the "off" magnet 113, which then will throw switch 110, to silence the set for that particular period.

A moment after the timing switch has operated to effect the above results, the contact arm 66, will connect contacts 68, and 70, to extend current through the line 173, and the particular circuit closed by the solenoid switch 83, and wiring 174, to one of the recording electrodes 152, return being by wiring 175—162. In this particular instance, the recording of the station in action at the time is effected by the electric discharge through the record strip at the particular station location on that strip and such discharge is timed to take place just following the closure of the timing circuit. This record is thus made at the end of each interval even though there may have been no change in stations.

A portion of the record with typical markings is shown in Fig. 12.

The voting is recorded in similar fashion by discharges through the record strip in the particular "yes" and "no" positions thereon by wires 176, 177, extending from the "yes" and "no" switch terminals 127, 128, to the "yes" and "no" recording electrodes 178, 179.

A twenty-four hour mark is made upon the record to facilitate the reading of the twenty-four hour intervals, by means of a special electrode 180, connected by wiring 181, with an extra brush contact 56a, which may be located in that idle period, between 2 and 6 o'clock in the morning, for instance, at the 4 a. m. position indicated.

The fader windings 140, are shown connected at 182, with the volume controls 104.

The switch manuals 109, for cutting in any selected tuner at any time are shown connected by wiring 183—160, with one side of the source, with return connection 184, through "on" magnet 112, and the wiring 167—162.

The horizontally extending bank of vertically operating slide keys provides an accessible, attractive and conveniently operable arrangement. Other arrangements are possible however, within the scope of the invention.

Thus in the embodiment illustrated in Figs. 16, 17, the slides are arranged radially about a centrally disposed clock, with the time contacts 40a, radially disposed and in line with the longitudinal travel of the brush contacts 35a, and the station selecting contacts 42a, are in the form of circular rings opposed to the ends of longitudinal contacts, where they can be reached by the brushes slidingly adjusted over the radial contacts.

The form of the invention illustrated in Figs. 18, 19, is similar to that last described, in that the slides are arranged radially about a central clock face, but these slides 22b, in the latter instance, operate in and out as plungers instead of radially. Also, in the latter instance, the spring brush 35b, extends transversely across the inner end of the plunger slide, with the inner end slidingly engaging a contact wire 40b, extending longitudinally of the plunger movement in the outer end engaging one of the surrounding circularly extending station selecting wires 42b, or the innermost, circular "off" wire 43b. The longitudinal contact wires 40b, are indicated as seated in grooves on the outside of the circular support 59b, where they can be engaged by the ends of the sliding brushes and as having end portions 56b, turned inward to serve as contacts for the rotating brush 55b.

This last described construction has the advantage of eliminating all wiring for the timer mechanism, since the circular group of wires 40b, serve both as the time contacts for the clock and the slide contacts for the station selector keys.

Instead of placing the station selecting contacts as rings surrounding the plunger slides, as in the last structure, these rings may be placed in a single circular row as indicated at 43c, Fig. 20, and the spring brush then be located in the side of the slide key after the manner of the first illustrated form of the invention.

The fader circuit controlled by spring pressed contacts 67, is closed ahead of the distributor circuit across the contacts 68, 69, for a period just long enough to fade out the sound of one program and is held closed for that short period in which the magnets are operating to bring in the new program and for the time necessary for such new program to be faded in and the record made on the record strip. Thus a silent change-over is effected, free of any switch clicking sounds or the like.

What is claimed is:

1. In apparatus of the character disclosed, the combination of an insulating annular support having spaced radial notches in the rim of the same, conductors having contact portions disposed within said annular support and radially extending portions located in said notches, an insulating ring engaged over the radially extending portions of said conductors for holding the same in place on said insulating annular support, means for securing said insulating ring in such relation and a distributor brush rotating concentrically within said annular support in sequential engagement with said contact portions of said conductors.

2. In apparatus of the character disclosed, the combination of an insulating annular support having spaced radial notches in the rim of the same, conductors having contact portions disposed within said annular support and radially extending portions located in said notches, an insulating ring engaged over the radially extending portions of said conductors for holding the same in place on said insulating annular support, means for securing said insulating ring in such relation, a current supply ring disposed within the annular support at one side of said contact portions of the conductors and a distributor brush rotating concentrically within said annular support and having separated, yielding branch portions engaging said current supply ring and contact portions of the conductors.

3. Time control apparatus comprising a flat insulating panel having a series of longitudinal, substantially parallel open top grooves in the face of the same and a series of transverse, substantially parallel open top grooves disposed across one end of said series of longitudinal grooves, time and station selecting conductors laid in said longitudinally and transversely extending grooves and exposed to the face of the panel, elongated, flat, thin insulating slides in side-by-side relation over said panel and in alignment with said longitudinal grooves, a panel overstanding said slides and having an opening exposing the mid portions of said slides, said slides having handle projections in said opening for the individual actuation of said slides, said slides having grooves in the backs of the same and spring brushes having arched intermediate portions held in said grooves and free end portions slidingly engaging the conductors laid in the longitudinal grooves and selectively engaging the conductors laid in the transverse grooves.

4. Time control apparatus comprising an insulating panel having a series of substantially parallel, open top, longitudinal grooves in the face of the same and a series of substantially parallel, transverse, open top grooves across one end of the longitudinal grooves, time and station selecting conductors seated in said longitudinal and transverse grooves exposed to the face of the panel, thin, flat operating members of insulating material confined for longitudinal movement over said longitudinal and transverse conductors and having grooves in the backs of the same in line with the longitudinal conductors, spring brushes having arched intermediate portions held in said grooves and free end portions slidingly engaging the longitudinal conductors and selectively engageable with said transverse conductors, said operating members having projecting handles for longitudinally shifting the same to slide the ends of said spring brushes over said longitudinal conductors and into selective engagement with said transverse conductors.

5. Time control apparatus comprising an insulating panel having a series of substantially parallel, open top, longitudinal grooves in the face of the same and a series of substantially parallel, transverse, open top grooves across one end of the longitudinal grooves, time and station selecting conductors seated in said longitudinal and transverse grooves exposed to the face of the panel, thin, flat operating members of insulating material confined for longitudinal movement over said longitudinal and transverse conductors and having grooves in the backs of the same in line with the longitudinal conductors, spring brushes having arched intermediate portions held in said grooves and free end portions slidingly engaging the longitudinal conductors and selectively engageable with said transverse conductors, said operating members having projecting handles for longitudinally shifting the same to slide the ends of said spring brushes over said longitudinal conductors and into selective engagement with said transverse conductors, said longitudinal and transverse grooves being of substantially V-shaped cross section and the conductors laid in said grooves being wires held in position in the bottoms of said V-shaped grooves, the ends of the spring brushes which engage in the transverse grooves being substantially V-shaped to retain the brushes and the operating members in which they are held, in various selected positions.

6. Time control apparatus comprising an annular support having spaced radially extending positioning notches in the rim of the same, an insulating support having a series of spaced positioning grooves in the face of the same, conductor wires having bare contact portions disposed in sequential arrangement within said annular support and radial portions located within said positioning notches, said wires extending continuously from said positioning notches to said insulating support and having bare contact portions disposed in said positioning grooves, a time operated distributor brush rotatable within said annular support and successively engageable with said bare contact portions of the wires positioned within said annular support, time selecting keys operable over the bare contact portions at the opposite ends of said wires disposed in the grooves in said panel, brushes carried by said keys in sliding engagement with said contact portions of the wires located in said grooves and spaced, relatively insulated contacts disposed in angular relation to said last mentioned contact portions of the wires for selective engagement by said brushes in the adjustment of the same by said time keys.

7. Time control apparatus comprising an insulating support having a group of spaced, substantially parallel, open top, longitudinal grooves and a series of spaced, substantially parallel, open top, transverse grooves across one end of the group of longitudinal grooves, longitudinally extending conductors seated in said longitudinal grooves and transversely extending conductors seated in said transverse grooves, elongated operating members of insulating material in substantially parallel side-by-side relation over said insulating support and in line with said longitudinally extending conductors, means confining said operating members in said side-by-side relation and for individual movement longitudinally of said longitudinal conductors, exposed handles for selectively shifting said operating members and spring brushes having intermediate portions secured in the backs of said operating members and free end portions respectively engageable with the conductors in said longitudinally and transversely extending grooves.

8. Time control apparatus comprising an insulating support, longitudinally extending conductors mounted in spaced side-by-side relation on said insulating support, transverse conductors mounted in spaced side-by-side relation on said support at one end of and spaced from the group of said longitudinally extending conductors, operating members of insulating material mounted in side-by-side relation over said insulating support in line with and movable in the direction of extent of said longitudinally extending conductors and spring brushes having intermediate portions actuatably engaged by said insulating operating members and free end portions respectively engaged with said longitudinally extending and transverse conductors, said brushes being arched each to reach from a point of sliding engagement with a longitudinally extending conductor at one end over intervening transverse conductors into engagement with a selected transverse conductor at the opposite end.

FREEMAN H. OWENS.